United States Patent [19]
Hermstein et al.

[11] 3,835,353
[45] Sept. 10, 1974

[54] CAPACITIVE VOLTAGE-DIVIDING ARRANGEMENT FOR HIGH VOLTAGE MEASURING APPARATUS

[75] Inventors: Wolfgang Hermstein; Eckart Maenicke, both of Berlin, Germany

[73] Assignee: Siemens Aktiengesellschaft, Munich, Germany

[22] Filed: Mar. 15, 1973

[21] Appl. No.: 341,673

[30] Foreign Application Priority Data
Mar. 29, 1972 Germany.......................... 2215928

[52] U.S. Cl................ 317/244, 317/242, 317/256, 317/258, 323/93
[51] Int. Cl............................................ H01g 3/02
[58] Field of Search...... 323/93; 317/242, 244, 261, 317/256, 258; 29/25.42

[56] References Cited
UNITED STATES PATENTS

| | | | |
|---|---|---|---|
| 1,000,925 | 9/1911 | Kuhlmann | 317/242 |
| 1,266,377 | 5/1918 | Alexanderson | 317/242 |
| 1,545,207 | 7/1925 | Smith | 317/242 |
| 1,758,968 | 5/1930 | Pickard | 317/242 |
| 2,451,338 | 10/1948 | Heller | 317/242 |
| 2,585,752 | 2/1952 | Dorst | 317/261 UX |
| 2,779,975 | 2/1957 | Lee | 317/261 X |
| 3,102,216 | 8/1963 | McGraw | 317/261 X |
| 3,243,673 | 3/1966 | Leach | 317/244 |
| 3,256,472 | 6/1966 | Centuriowi | 317/260 |

Primary Examiner—E. A. Goldberg
Attorney, Agent, or Firm—Kenyon & Kenyon Reilly Carr & Chapin

[57] ABSTRACT

In a capacitive voltage-dividing device of the type having a high-voltage capacitor connected in series with a low-voltage capacitor for high voltage measurements, particularly in connection with fully insulated, metal clad, high voltage switch-gear, an improved arrangement comprises an inner electrode connected to the high voltage bus of the switchgear and extending through an opening in the metal cover; an intermediate or measuring electrode surrounding the inner electrode; and an outer electrode forming a cap-like extension of the metal cover and surrounding the measuring electrode in spaced, insulated relation. The measuring electrode in combination with the inner electrode forms the high voltage capacitor, and the measuring electrode in combination with the outer electrode forms the low voltage capacitor of the arrangement.

23 Claims, 6 Drawing Figures

CAPACITIVE VOLTAGE-DIVIDING ARRANGEMENT FOR HIGH VOLTAGE MEASURING APPARATUS

BACKGROUND OF THE INVENTION

1. Field of the Invention

The present invention relates to a capacitive voltage-dividing arrangement for use in high-voltage measuring apparatus of the type used with fully insulated, metal clad, high-voltage switchgear.

2. Description of the Prior Art

When measuring high alternating voltages it is customary to use either inductive or capacitive devices to couple the voltage measuring apparatus to the high-voltage source in order to transform or divide the voltage to a predetermined fractional value that is more easily and safely handled. Capacitive devices are preferred for use with fully insulated, metal clad, high-voltage switchgear because they are relatively inexpensive, occupy the smallest possible volume, and meet dry insulation requirements.

A specific capacitive voltage measuring apparatus for use with metal clad switchgear is described in the German publication "Smit-Mededelingen," Volume 24, No. 4 (1969) at pages 223–232. In this prior apparatus the voltage is measured by means of a capacitive voltage divider feeding an amplifier circuit. The voltage divider consists of a high-voltage capacitor and a separate low-voltage capacitor connected in series.

The high-voltage capacitor is mounted inside a tank connected to the metal cover of the switchgear and includes an elongated conductor connected at one end to the high-voltage bus of the switchgear and attached at the other end to a stub mounted on a flange inside the tank. This elongated high-voltage conductor forms the inner electrode of the high-voltage capacitor. A second or measuring electrode in the form of a cylinder concentrically surrounds the inner electrode.

The low-voltage capacitor is disposed outside the tank as a separate component, and the amplifier is connected to the measuring electrode by a coaxial cable. The output of the amplifier thereby provides a signal proportional to the voltage on the switchgear bus.

SUMMARY OF THE INVENTION

The present invention is an improved arrangement of the prior art capacitive voltage-dividing device described above in which both the high-voltage and low-voltage capacitors form a single unitized structure that extends from the metal covering of the switchgear either assymmetrically or as a circular bulge.

As in the prior device, the present arrangement includes an inner electrode connected to the high-voltage bus of the switchgear and a second or measuring electrode. Instead of being cylindrical, however, the measuring electrode of the present invention is shaped like a cap and almost completely encloses the first electrode to obtain a large capacity. The capacity of the high-voltage capacitor is still further enhanced by designing the first electrode with an especially large surface area. In this way the arrangement is less susceptible to interference, thereby permitting the use of a less expensive amplifier for the signal from the measuring electrode.

As mentioned above, the low-voltage capacitor is designed as structurally integral with the high-voltage capacitor and is formed by surrounding the measuring electrode with an outer electrode uniformly spaced and insulated from the measuring electrode. In this way the entire capacitive voltage divider can be produced relatively inexpensively. The prior art concept of a high-voltage capacitor in a tank is thereby supplemented by adding a third electrode surrounding the measuring electrode and spaced from it by some sort of insulating supports. In this way, the need for a separate low-voltage capacitor as an independent component is eliminated. In fact, the tank shell itself can serve as the third electrode.

In addition to the compactness and reduced cost of its unitized design, the capacitive voltage divider of the present invention has the further advantage of permitting the same dielectric for both capacitors so that variation of the dielectric constant with temperature will be the same for both capacitors, thereby improving the stability of the voltage division ratio.

In a preferred embodiment, an elongated conductor, attached at one end to the high-voltage bus of a metal clad switchgear, extends through an opening in the metal cover of the switchgear into a tank which forms an extension of the cover. An inner electrode of large area is mounted on the other end of the high-voltage conductor, which is rigidly supported by a feedthrough insulator mounted in the opening between the switchgear cover and the capacitor tank. An intermediate measuring electrode and an outer low-voltage electrode surround the first electrode like caps.

Supporting the high-voltage conductor by a feedthrough insulator at the point where it enters the capacitor tank permits mounting an inner electrode of relatively large area on the free end of the conductor and also allows the inner electrode to be completely surrounded by cap-like intermediate and outer electrodes. Thus, for given tank volume and length, the capacitance of the high-voltage capacitor can be greatly increased over the coaxial cylinder arrangement of the prior art.

At the same time, the low-voltage capacitor of the preferred arrangement also has a relatively large capacitance, and the capacitances of both capacitors are distributed symmetrically about the axis of the supporting high-voltage conductor, which reduces the effects of interference caused, for example, by short circuits.

As is well known, the capacitance between two spaced conductive surfaces is directly proportional to their areas and inversely proportional to the distance between them. The capacitance is also directly proportional to the dielectric constant of the insulating medium between them. Because the high voltage of the switchgear limits the minimum spacing between the inner and intermediate electrodes, even with highly insulating dielectric media, the principal variable for increasing the capacitance of the high-voltage capacitor is the area of the inner electrode.

The inner electrode may have many shapes; for example, it can be a spherical shell. To provide a large surface area in relation to volume, however, it is preferred to make the inner electrode in the form of a ring mounted on the end of the high-voltage conductor with its central axis perpendicular to the axis of the conductor. With this arrangement, additional capacitance can be obtained by positioning a conductive cylinder through the ring concentric with its axis and attached at each end to the intermediate electrode so as to become electrically part of the measuring electrode. The partial capacities formed between this cylinder and the inner surface of the ring then increase the total capacitance of the high-voltage capacitor.

In designing the form of the ring-shaped inner electrode it is desirable to keep the spacing between its outer surface and the cap-like intermediate electrode and between its inner surface and the coaxial cylinder as uniform as possible and, also, to avoid sharp bends which can form arcing points.

The shape of the cap-like intermediate and outer electrodes is less susceptible to variations, but their manner of construction can be varied, depending principally on whether solid or fluid dielectric is used for the low-voltage capacitor. The preferred construction is for the outer electrode to be a grounded sheet metal shell forming an extension of the meatl switchgear cover to provide both strength and shielding from the high voltage within the tank. The intermediate electrode is then preferably formed of a relatively stiff metal shell supported by suitable insulating spacers within the outer electrode.

This preferred arrangement permits the entire tank to be filled with a gaseous dielectric, for example the insulating gas sulfur hexafluoride, or with a liquid dielectric, for example the insulating liquid sold under the trademark CLOPHEN. These fluids serve as a uniform, continuous dielectric medium for the high-voltage and low-voltage capacitors, with the resultant stabilizing effect on the relative temperature sensitivity of the capacitances of the two capacitors.

An insulating gas is especially preferred if the switchgear, itself, is filled with such a gas. In that case openings can be provided in the feed-through insulator so that the same gas can be used in both the switchgear and the capacitor tank, and only a single gas pressure monitoring system is required. To prevent voltage breakdown across the feedthrough insulator these openings should alternate with the insulator material to form insulating barriers.

On the other hand, if an insulating liquid is used in the tank, there should be no openings through the feedthrough insulator, and the capacitive voltage divider can be a self-contained unit.

Alternatively, the low-voltage capacitor can be constructed by coating the inside of the metal tank shell with an insulating material and then plating, or otherwise coating, the insulating material with a conductive layer to form the intermediate electrode. The metal tank shell can also serve as the intermediate electrode, if it is suitably insulated from the switchgear cover, and the outer electrode constructed by applying successive layers of an insulating and a conductive material on the outside of the shell. Or the tank shell itself can be made of an insulating material, coated both inside and outside with conductive layers to form the intermediate and outer electrodes, respectively.

In the above alternate embodiments, the space inside the tank can be filled with an insulating liquid or an insulating gas to serve as the dielectric for the high-voltage capacitor, or it can be filled with a casting resin of the type conventionally used in voltage measuring transformers, but preferably with added fillers of high dielectric constant such as rutile, i.e., naturally occurring titaniun dioxide. The advantage of filling the tank with casting resin is that it provides structural support for the electrodes as well as insulation between them.

In fact, the entire structure of both capacitors can be made of casting resin, for example, by first casting an integral feedthrough insulator and inner electrode support structure, coating the inner electrode support structure with a conductive layer to form the inner electrode, casting a dome-shaped body of resin over the inner electrode, covering the dome-shaped body with a conductive layer to form the intermediate electrode, coating the intermediate electrode with another layer of casting resin, and finally adding an outer conductive coating or shell to form the outer electrode. The result is a solid capacitive voltage-dividing structure that is largely free of internal mechanical stresses and having a practically uniform coefficient of thermal expansion as well as uniform variation of dielectric properties with temperature.

Still another possible embodiment includes a conductively plated, cast resin inner electrode and integral feedthrough insulator and a separate cast resin cap-like shell, conductively coated inside and outside, in combination with a gas or liquid dielectric between the inner and intermediate electrodes. In addition, the previous embodiments may alternately include an inner electrode support structure made of any suitable elastic material having a thermal coefficient of expansion similar to that of the casting resin, the important consideration being to avoid differential expansion or shrinkage that would create mechanical stresses in and distortion of the electrodes.

Although the foregoing description has been of an arrangement that is assymmetrical with respect to the switchgear cover (that is, to a capacitor arrangement within an essentially dome-shaped tank attached to or extending in one direction from the outer surface of the switchgear cover), an important feature of the arrangement of the three electrodes is that they are substantially symmetrical with respect to each other. This is particularly true of the intermediate and outer electrodes, but in any given plane passing through the central axis the preferred ring-shaped inner electrode is also substantially symmetrical about that axis. This symmetry insures that the large electrostatic forces produced by the high potential differences between electrodes will also be symmetrical, thus minimizing induced vibrations and relative motion between electrodes.

Of course, other configurations could provide this desirable symmetry. For example, all three electrodes could encircle the switchgear in a ring-shaped tank around the metal cover.

DETAILED DESCRIPTION OF THE PREFERRED EMBODIMENT

Figure 1:
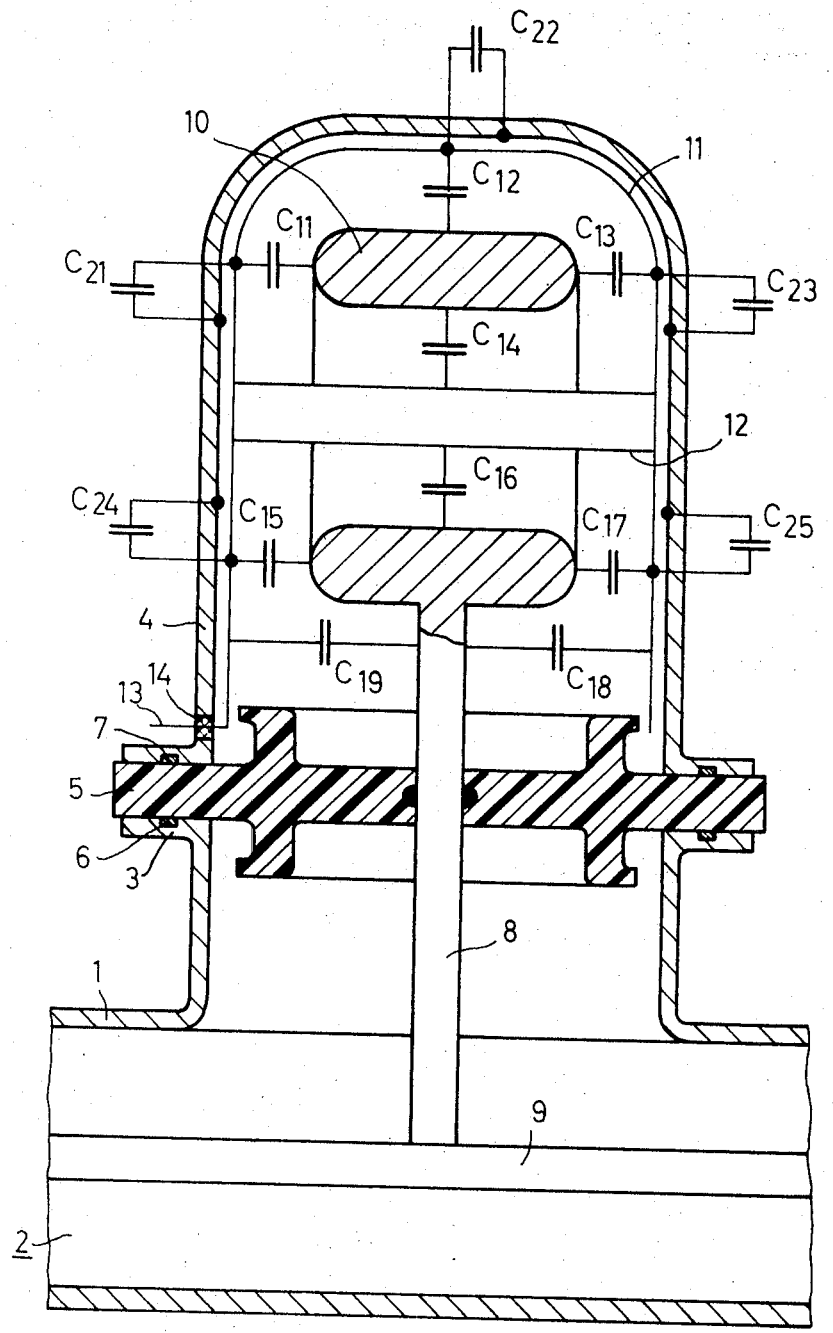
FIG. 1 is a schematic diagram, partially in section, of the capacitive voltage divider according to the invention, somewhat simplified, combined with an electrical schematic diagram illustrating the function of the structure.

In the Figure, a metal cover 1 for a high-voltage system 2, such as a fully insulated, metal clad, high-voltage switchgear, has an opening with a flange 3 for attaching a flanged, dome-shaped metal tank 4 for containing a capacitive voltage-dividing device. A disc-shaped feedthrough insulator 5, preferably made of cast insulating resin, is clamped between the flanges of the switchgear cover and capacitor tank, with O-ring seals 6 and 7 preventing leakage of gaseous or liquid dielectric from the interior of the switchgear and tank, respectively.

An elongated high-voltage conductor 8 is electrically connected at one end to the high-voltage bus of the switchgear by conventional means such as plug, screw or clamp (not shown in detail).

Conductor 8 is firmly anchored in feedthrough insulator 5 so that its free end, extending into the tank, provides a rigid support for a ring-shaped inner electrode 10. Electrode 10, together with the portion of conductor 8 that is within the tank forms the high-voltage electrode of a high-voltage capacitor; a cap-like conducting intermediate shell 11 surrounding the ring-shaped inner electrode forms the other electrode of the high-voltage capacitor. A conductive cylindrical tube 12 extends between diametrically opposed points on shell 11 through the center of electrode 10 and adds capacitive area to shell 11.

The total capacitance of the high-voltage capacitor is made up of the partial capacities between the various opposed surfaces of the inner and intermediate electrodes, as illustrated schematically by equivalent capacitors $C_{11}$, $C_{12}$, $C_{13}$, $C_{14}$, $C_{15}$, $C_{16}$ and $C_{17}$, as well as the capacities $C_{18}$ and $C_{19}$ which represent the partial capacitance between high-voltage conductor 8 and intermediate shell 11. Since capacitances $C_{11}$ through $C_{19}$ are in parallel, the overall capacitance of the high-voltage capacitor is equal to their sum.

Conductive shell 11 is held in uniformly spaced relation from the inner surface of tank cover 4 by suitable insulating means, not shown. Such means may include individual spacers of ceramic or cast resin, for example, to permit free circulation of liquid or gas dielectric between shell 11 and cover 4. Alternatively, the space between the shell and cover may be filled with a solid dielectric, which both supports the shell and insulates it from the cover, as described earlier.

The low-voltage capacitor of the arrangement is thus formed by intermediate shell 11 and outer cover 4, its total capacitance being equal to the sum of the partial capacitances between the opposed surfaces of these two electrodes and illustrated schematically by capacitors $C_{21}$, $C_{22}$, $C_{23}$, $C_{24}$ and $C_{25}$.

In the drawing, feedthrough insulator 5 is shown without openings so that the interior of the capacitor tank is sealed from the interior of the switchgear. As mentioned above, the tank may be filled with insulating liquid or insulating gas, in both cases under pressure. An electrical conductor 13 from intermediate electrode 11 passes through a pressure-tight insulating bushing 14 in the tank cover for connection to a conventional voltage measuring amplifier (not shown). Such amplifiers are conventionally located in a housing attached to the capacitor tank.

It will be appreciated that if the switchgear is filled with pressurized insulating gas, the feedthrough insulator can have openings to permit the gas to also fill the capacitor tank, if desired. As discussed above, any such openings should alternate with solid material of the feedthrough to prevent breakdown.

Inner electrode 10 is shown in the drawing as made of metal, but it may also be made of metal plated insulating material such as cast resin, and the feedthrough insulator and inner electrode can be made as an integral structure, as described earlier. Finally, the entire space within the tank may be filled with a casting resin instead of an insulating gas or liquid, if desired.

The present invention, therefore, provides an improved capacitive voltage divider arrangement, for use in measuring high voltages in equipment such as fully insulated, metal clad switchgear, in which both capacitors are housed in an extension of the metal cover of the equipment, and the capacitors share a common electrode. All three electrodes of the two capacitors are arranged symmetrically with respect to each other, thereby minimizing the influence of interference voltages caused by short circuits. In the preferred embodiment, the inner high-voltage electrode is ring-shaped for providing an advantageously large surface area and consequently high capacitance in relation to the size of the unit. The intermediate and outer electrodes almost completely surround the inner electrode, except for an opening only large enough to admit the high-voltage conductor that connects the inner electrode to the high-voltage bus of the equipment being measured. The resulting arrangement is compact, fully shielded, structurally strong, and provides an inherently stable voltage division ratio that is relatively insensitive to temperature changes.

Figure 2:
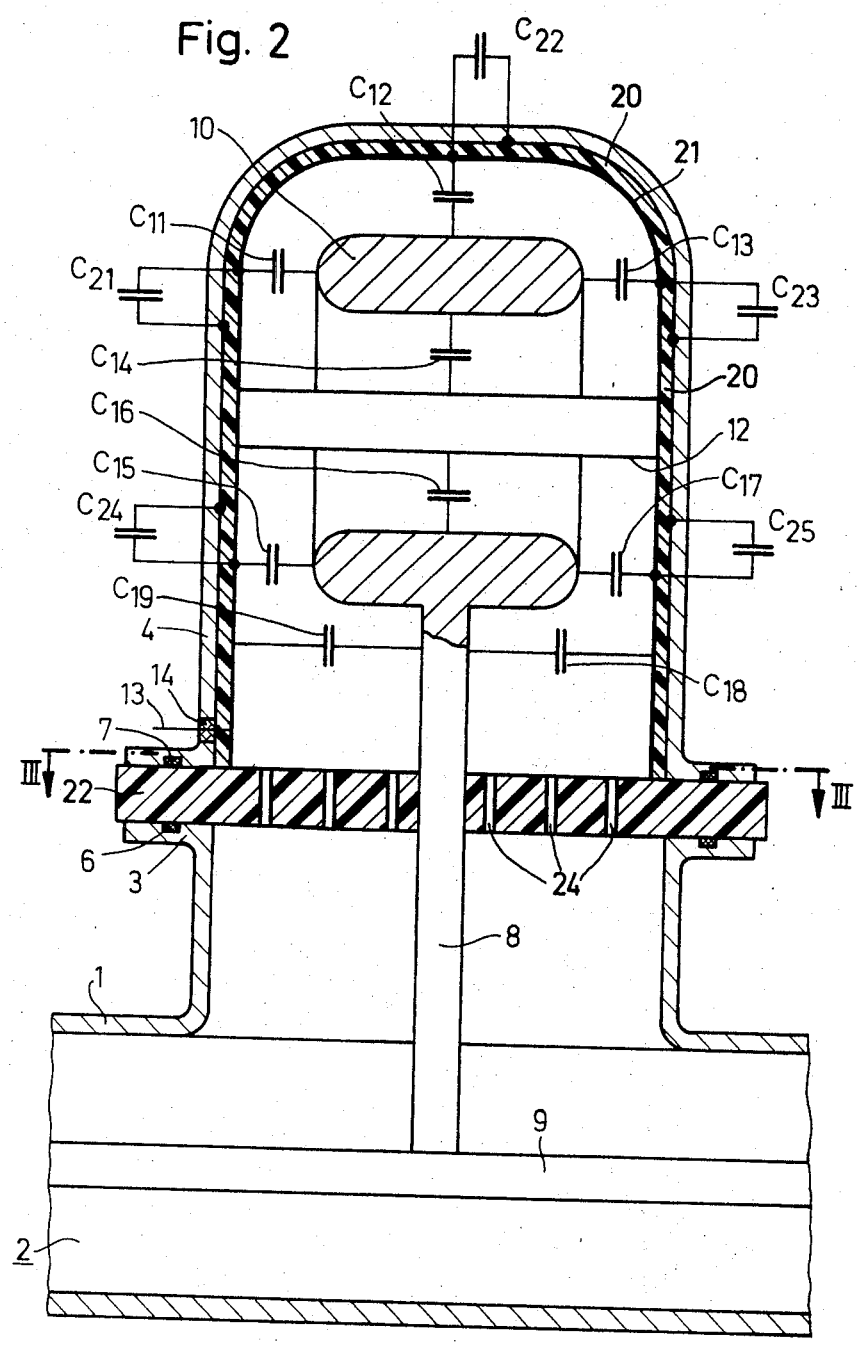
FIG. 2 is a schematic diagram of the capacitive voltage divider of FIG. 1 illustrating how the intermediate electrode can be configured according to a subsidiary embodiment of the invention. Also shown, is how the feedthrough insulator can be equipped with openings for permitting the insulating gas in the metal-clad equipment to communicate with the hollow space of the outer electrode of the capacitive voltage divider.

The embodiment of the invention shown in FIG. 2 distinguishes from the embodiment of FIG. 1 in that the low-voltage electrode configured in the form of a tank 4 is provided with spacer means in the form of an insulating layer 20 which can, for example, be made of cast resin. A conductive coating 21 is applied to the jacket of insulating material 20 and constitutes the measuring electrode.

Figure 3:
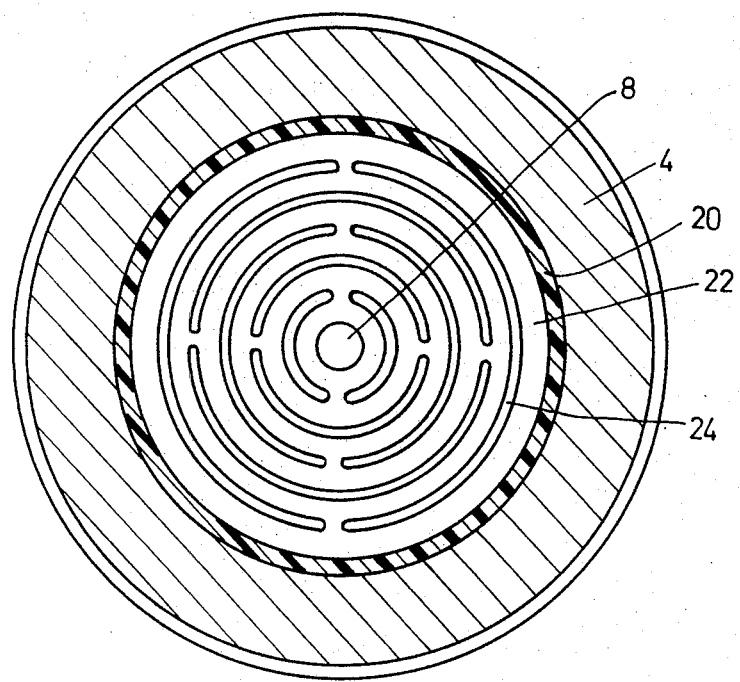
FIG. 3 is a section view taken along the line III—III of FIG. 2.

The outer electrode 4 is attached in fluidtight relation to an opening in the cover of metal clad high-voltage equipment 1 filled with an insulating gas. The feedthrough insulator 22 carries the connecting conductor 8 of the inner electrode 10 and is provided with long openings 24 for permitting the gas in the metal clad equipment to communicate with the hollow space within the outer electrode. The openings 24 in the feedthrough insulator 22 can be elongated holes alternating in the radial direction with material of the feedthrough forming insulating barriers as shown in FIG. 3. This configuration of the feedthrough insulator 22 is advantageous if the dielectric of the voltage measuring arrangement in the tank 4 is of the same insulating material which is found in the high-voltage switching installation 2.

Figure 4:
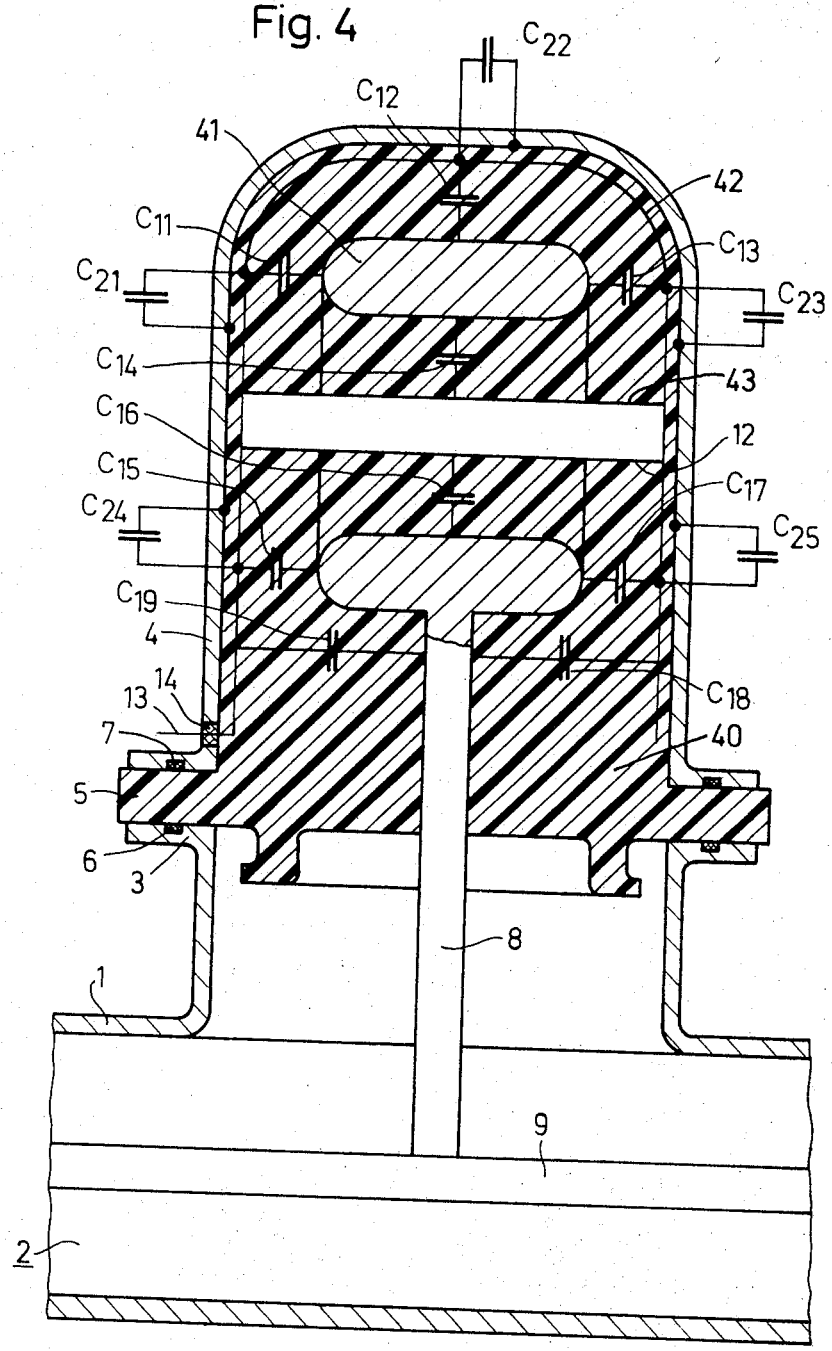
FIG. 4 is a schematic diagram, partially in section, which shows how the capacitive voltage divider can be equipped with solid insulation in the spaces between the respective electrodes.

FIG. 4 illustrates an embodiment of the invention wherein the space between the electrodes is filled with cast resin 40. The cast resin body 40 serves also as a feedthrough for the connecting electrode 8. In the body 40, there is provided a high-voltage electrode 41, a measuring electrode 42 and a tube 43 embedded as a consequence of a casting procedure for the cast resin.

Figure 5:
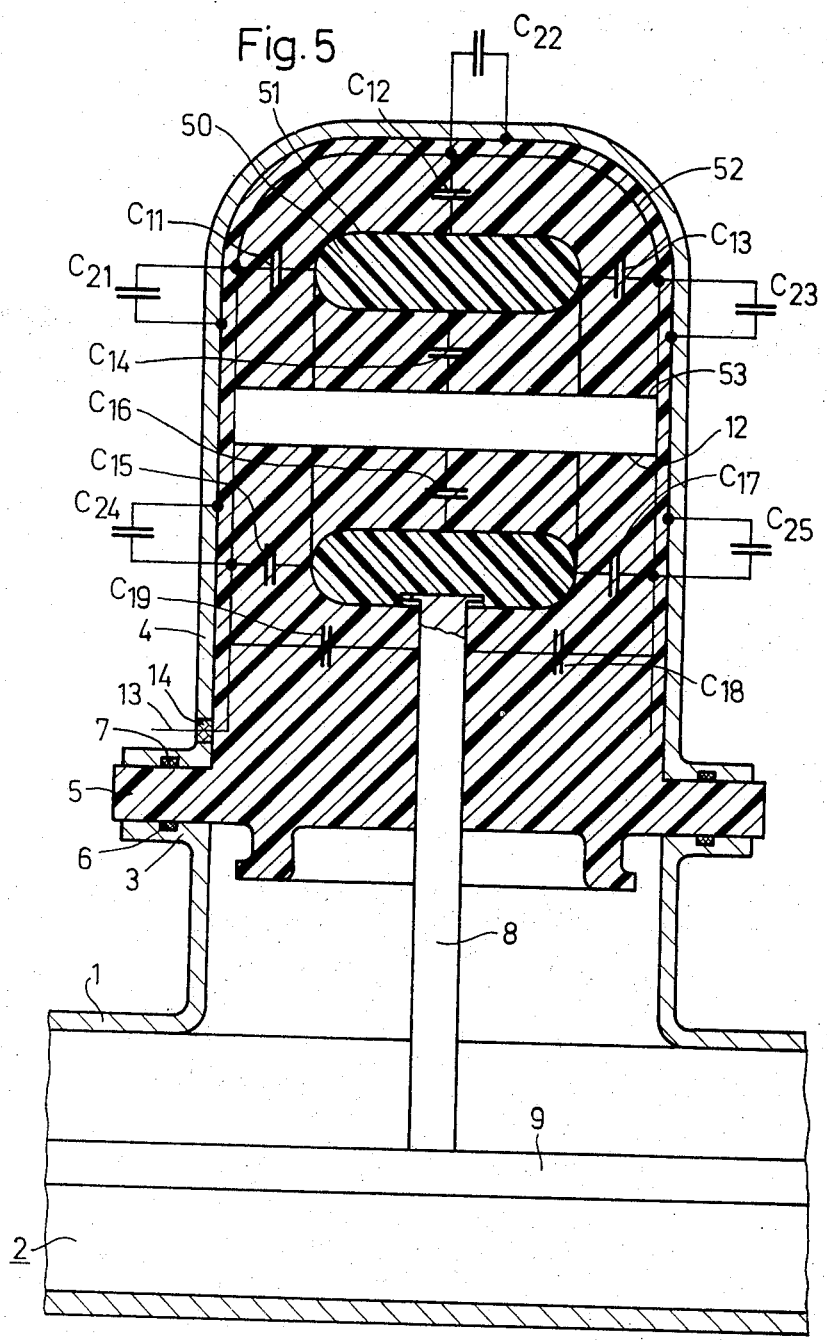
FIG. 5 illustrates an embodiment of the invention wherein the conductive inner electrode of the capacitive voltage divider is made with insulating material with conductive coating applied thereto.

FIG. 5 illustrates an embodiment wherein the high-voltage electrode consists preferably of a body 50 made of cast resin and to which a conductive coating 51 is applied. The conductive coating 51 is electrically joined to the connecting electrode 8 and therefore constitutes the high-voltage electrode. The body 50 with the conductive coating 51 is first made separately in a casting process and thereafter together with a measuring electrode 52 and a tube 53 is cast in the tank 4 to form a cast resin block with provision being made for a feedthrough guide to accommodate the connecting electrode 8.

Figure 6:
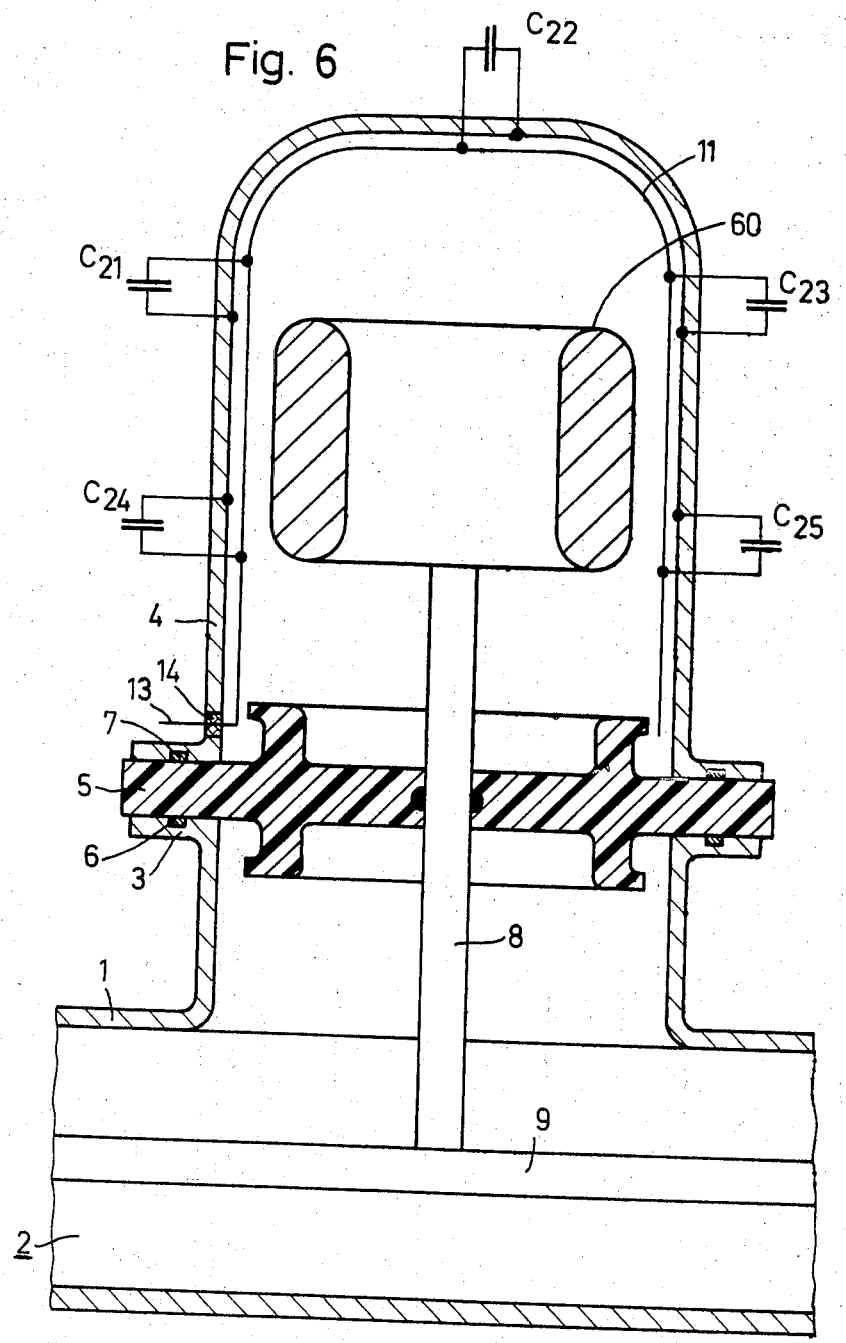
FIG. 6 is an embodiment of the capacitive voltage divider according to the invention wherein the high-voltage electrode is arranged so as to be symmetrical with respect to the measuring electrode.

The embodiment of FIG. 6 is a configuration alternate to that shown in FIG. 1. Here, the high-voltage electrode 60 is mounted so as to be symmetrical to the measuring electrode 11 and to the tank 4 which constitutes the low-voltage electrode.

We claim:

1. A capacitive voltage divider of the type having a high-voltage capacitor in series with a low-voltage capacitor for use with measuring equipment to make high-voltage measurements in a fully-insulated, metal-clad high-voltage installation having an extension on the metal enclosure thereof for accommodating the voltage divider, the improved arrangement comprising:

a hollow conductive outer electrode having an opening to its interior;
a hollow conductive intermediate electrode positioned inside the outer electrode to conjointly define therewith the low-voltage capacitor of the divider, the outer surface of the intermediate electrode being in spaced, insulated relation to the inner surface of the outer electrode, the intermediate electrode having an opening aligned with the opening in the outer electrode;
connection means for connecting the measuring equipment to the intermediate electrode; and
a conductive inner electrode positioned inside the intermediate electrode to conjointly define therewith the high-voltage capacitor of the divider, the inner electrode being in spaced, insulated relation to the inner surface of the intermediate electrode and having an elongated conductor extending through the openings in the intermediate and outer electrodes for connection to a high-voltage source in the high-voltage installation to be measured.

2. The arrangement of claim 1 further comprising a feedthrough insulator mounted in the opening of the outer electrode for supporting the inner electrode in fixed relation to the outer electrode.

3. In a capacitive voltage divider of the type having a high voltage capacitor in series with a low-voltage capacitor for use in making high voltage measurements, the improved arrangement comprising:

a hollow conductive outer electrode having an opening to its interior;
a hollow conductive intermediate electrode positioned inside the outer electrode with its outer surface maintained in spaced, insulated relation to the inner surface of the outer electrode, the intermediate electrode having an opening aligned with the opening in the outer electrode;
a conductive inner electrode positioned inside the intermediate electrode in spaced, insulated relation to the inner surface of the intermediate electrode and having an elongated conductor extending through the openings in the intermediate and outer electrodes for connection to a source of high voltage to be measured, whereby the inner electrode and intermediate electrode form the high-voltage capacitor and the intermediate electrode and outer electrode form the low-voltage capacitor of the voltage divider; and said inner electrode comprising a ring-shaped member having its axis of rotational symmetry extending at right angles to the longitudinal axis of the connecting conductor.

4. The arrangement of claim 3 further comprising:

a cylindrical conductive member extending coaxially through the ring-shaped inner electrode and electrically connected to the intermediate electrode for increasing the effective capacitance of the high-voltage capacitor.

5. The arrangement of claim 1, the outer electrode being the extension on the high-voltage installation.

6. The arrangement of claim 1 further comprising:

insulating spacer means for rigidly supporting the intermediate electrode at a predetermined distance from the inner surface of the outer electrode.

7. The arrangement of claim 6 wherein the insulating spacer means comprises an insulating coating of predetermined thickness applied to the inner surface of the outer electrode, and the intermediate electrode comprises a conductive coating applied to the inner surface of the insulating coating.

8. The arrangement of claim 1 wherein the space between the electrodes is filled with an insulating gas as a dielectric.

9. The arrangement of claim 8 wherein the insulating gas comprises sulfur hexafluoride.

10. The arrangement of claim 1 wherein the space between the electrodes is filled with an insulating liquid as a dielectric.

11. The arrangement of claim 2 further comprising:

fluidtight sealing means between the feedthrough insulator and the outer electrode.

12. In a capacitive voltage divider of the type having a high voltage capacitor in series with a low-voltage capacitor for use in making high voltage measurements in metal-clad, high-voltage installations, the improved arrangement comprising:

a hollow conductive outer electrode having an opening to its interior;
a hollow conductive intermediate electrode positioned inside the outer electrode with its outer surface maintained in spaced, insulated relation to the inner surface of the outer electrode, the intermediate electrode having an opening aligned with the opening in the outer electrode;

a conductive inner electrode positioned inside the intermediate electrode in spaced, insulated relation to the inner surface of the intermediate electrode and having an elongated conductor extending through the openings in the intermediate and outer electrodes for connection to a source of high voltage to be measured, whereby the inner electrode and intermediate electrode form the high-voltage capacitor and the intermediate electrode and outer electrode form the low-voltage capacitor of the voltage divider; and a feedthrough insulator mounted in the opening of the outer electrode for supporting the inner electrode in fixed relation to the outer electrode; the outer electrode being attached in fluidtight relation to an opening in the cover of the metal clad high voltage installation filled with an insulating gas, and the feedthrough insulator having openings for permitting the gas in the metal clad installation to communicate with the hollow space within the outer electrode.

13. The arrangement of claim 12 wherein the openings in the feedthrough insulator comprise elongated holes alternating in the radial direction with material of the feedthrough forming insulating barriers.

14. The arrangement of claim 1 wherein the space between the electrodes is filled with casting resin.

15. The arrangement of claim 14 wherein the casting resin contains filler material of high dielectric constant.

16. The arrangement of claim 15 wherein the filler material comprises rutile.

17. The arrangement of claim 14 wherein the inner electrode comprises a body of elastic material covered with a conductive coating, the elastic material having a thermal coefficient of expansion similar to that of the casting resin.

18. The arrangement of claim 17 wherein the elastic material comprises casting resin.

19. The arrangement of claim 14 wherein the casting resin extends to the opening of the outer electrode to form an integral feedthrough insulator around the high-voltage conductor.

20. The arrangement of claim 1 wherein the inner, intermediate and outer electrodes are arranged symmetrically with respect to each other.

21. In a capacitive voltage divider of the type having a high voltage capacitor in series with a low-voltage capacitor for use in making high voltage measurements with measuring equipment, the improved arrangement comprising:

an elongated conductor for connection at one end to a source of high-voltage;

an inner electrode mounted on the other end of the conductor;

a body of insulating resin material cast around the inner electrode and a portion of the elongated conductor;

a first conductive coating applied to the outside of the cast resin body to form an intermediate electrode;

connection means for connecting the measuring equipment to the intermediate electrode;

a layer of insulating material surrounding the first conductive coating; and a conductive shell surrounding the insulating layer to form an outer electrode, whereby the inner electrode and intermediate electrode comprise the high-voltage capacitor and the intermediate electrode and outer electrode comprise the low-voltage capacitor of the voltage divider.

22. The arrangement of claim 21 wherein the dielectric coefficient of the layer of insulating material between the intermediate and outer conductors has the same thermal behavior as that of the body of insulating resin.

23. The arrangement of claim 21 wherein the conductive shell comprises a second conductive coating applied to the outside surface of the insulating layer.

* * * * *